United States Patent [19]

Greer

[11] Patent Number: 4,901,962

[45] Date of Patent: Feb. 20, 1990

[54] CLIP FOR HOLDING PAPERS TO A WALL

[76] Inventor: David A. Greer, 181 Ada Ave. #46, Mountain View, Calif. 94043

[21] Appl. No.: 284,351

[22] Filed: Dec. 14, 1988

[51] Int. Cl.⁴ ................................................. E04G 3/00
[52] U.S. Cl. ................................... 248/218.3; 24/555; 24/564
[58] Field of Search ............... 248/218.1, 218.2, 218.3, 248/218.8, 316.7, 302; 24/533, 534, 546, 547, 549, 540, 555, 556, 563, 564; 40/659

[56] References Cited

U.S. PATENT DOCUMENTS

| 330,833 | 11/1885 | Harger | 24/555 |
|---|---|---|---|
| 1,158,940 | 11/1915 | Litt et al. | 40/659 |
| 1,793,520 | 2/1931 | Siptrott | 24/552 X |
| 1,873,228 | 8/1932 | Thompson | 24/555 X |
| 1,998,033 | 4/1935 | Tucker | 24/555 X |
| 2,104,612 | 1/1938 | Droll | 248/218.3 X |

FOREIGN PATENT DOCUMENTS 159332 3/1921 United Kingdom ................. 24/555

Primary Examiner—J. Franklin Foss
Attorney, Agent, or Firm—Rosenblum, Parish & Bacigalupi

[57] ABSTRACT

A clip composed of a resilient material such as steel wire or a plastic that is formed for attachment to the fabric surface of a modular wall unit, and which will hold papers thereto.

6 Claims, 1 Drawing Sheet

U.S. Patent    Feb. 20, 1990    4,901,962

CLIP FOR HOLDING PAPERS TO A WALL

BACKGROUND OF THE INVENTION

1. Field of the Invention

The invention relates generally to clips and more particularly to clips formed of wire or a wire-like material for holding papers to a wall.

2. Description of the Prior Art

A typical wall configuration in modern office buildings consists of modular wall units that are formed with a fabric outer surface. The structure of such modular wall includes framing elements, interior structural elements and a padding material between the structural elements. Various devices may be employed to hold pieces of paper to the fabric surface of such modular wall. Thumb tacks or push pin can be utilized in areas of the wall where structural members exist; however, if the pin is located in areas of non-solid backing material, the pin will simply fall out when a load is placed on it. Spring-loaded clips having a velcro pad for attachment to the fabric surface have proved usable. However, such clips typically require two hands to operate and insert papers therein.

Other prior art known to the inventor includes G. W. McGill U.S. Pat. No. 731,597, issued June 23, 1903; R. S. Bennett U.S. Pat. No. 1,858,130, issued May 10, 1932; N. T. Hooks U.S. Pat. No. 2,549,200, issued Apr. 17, 1951; A. N. Hanna U.S. Pat. No. 2,863,202, issued Dec. 9, 1958; R. L. Whitman U.S. Pat. No. 3,256,629, issued June 21, 1966; and Bruce Young, Jr. U.S. Pat. No. 3,967,346, issued July 6, 1988. Each of these patents, while exempletive of the prior art in this area, is not well suited for use on the fabric-surfaced modular wall units currently used in many offices today. There is therefore a need for a simple clip that can be attached at any location to the fabric of a modular wall unit, and which will simply and effectively hold papers to the fabric surface of the wall unit.

SUMMARY OF THE INVENTION

It is an object of the present invention to provide a clip that is suitable to hold papers to the fabric surface of a modular wall unit.

It is another object of the present invention to provide a clip formed from a resilient material that will hold papers to the fabric surface of a modular wall unit.

It is a further object of the present invention to provide a clip that is easily installed at any location on the fabric surface of a modular wall unit for holding papers to the fabric surface thereof.

It is yet another object of the present invention to provide a clip for holding papers to the fabric surface of a modular wall unit that is simple and inexpensive to manufacture and easy to install and utilize.

The present invention includes a clip composed of a resilient material such as steel wire or a plastic that is formed for attachment to the fabric surface of a modular wall unit, and which will hold papers thereto. When viewed from the side, the preferred embodiments may be thought of as having a modified "R" shape, wherein the straight shaft of the back of the "R" is utilized to penetrate the fabric surface of the wall unit and the bottom portion of the loop of the "R" and the downwardly, outwardly projecting leg of the "R" are designed to hold papers against the fabric displaced by the back member. In the preferred embodiments, the lower tip of the back member may be sharpened for ease of penetration of the fabric, and portions of the contact surfaces of the "R" may be roughened for increased frictional engagement with the paper.

It is an advantage of the present invention that it provides a clip that is suitable to hold papers to the fabric surface of a modular wall unit.

It is another advantage of the present invention that it provides a clip formed from a resilient material that will hold papers to the fabric surface of a modular wall unit.

It is a further advantage of the present invention that it provides a clip that is easily installed at any location on the fabric surface of a modular wall unit for holding papers to the fabric surface thereof.

It is yet another advantage of the present invention that it provides a clip for holding papers to the fabric surface of a modular wall unit that is simple and inexpensive to manufacture and easy to install and utilize.

The foregoing and other objects, features and advantages of the present invention will be apparent from the following detailed description of the preferred embodiments which make reference to the several figures of the drawing.

IN THE DRAWINGS

DESCRIPTION OF THE PREFERRED EMBODIMENT

Figure 1:
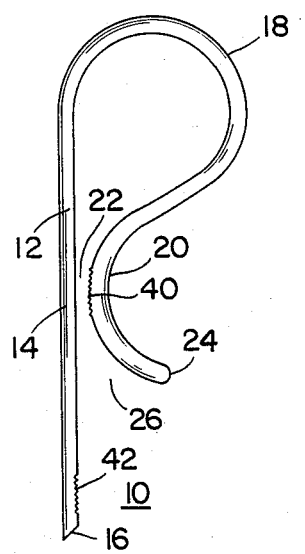
FIG. 1 is a side elevational view of a first embodiment of the present invention.
Figure 2:
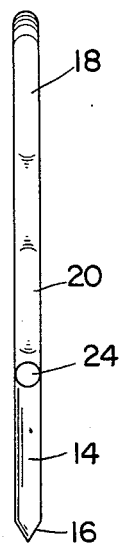
FIG. 2 is an end elevational view of the embodiment depicted in FIG. 1.

A first preferred embodiment 10 of the wall clip of the present invention is depicted in FIGS. 1 and 2. The first embodiment 10 is formed from a length of wire-like resilient material 12 that is shaped substantially as a modified "R". As depicted in FIGS. 1 and 2, the clip 10 is formed with a straight portion 14 which can be thought of as the straight back portion of the "R". The straight portion 14 is preferably formed with a sharpened lower end 16. The upper end of the straight portion 14 of the wire 12 is bent into a relatively large loop portion 18 having an arc that is greater than 180 degrees, which turns back toward the straight portion 14 approximately midway in the length of the straight portion 14. The loop portion 18 may be thought of as the loop of the "R" shape. The wire 12 is thereafter formed with an outwardly, downwardly bent portion 20, such that a narrow gap 22 is formed between the straight portion 14 and the outwardly bent portion 20. The outwardly, downwardly bent portion may be thought of as the leg of the "R" shape. A second end 24 of the wire 12 terminates the clip following the outward bend 20, such that a relatively larger gap 26 is formed between the straight portion 14 and the end 24. As depicted in FIG. 2, the bends 18 and 20 formed in the wire 12 are preferably formed such that the clip 10 is planar when viewed from the front.

Figure 3:
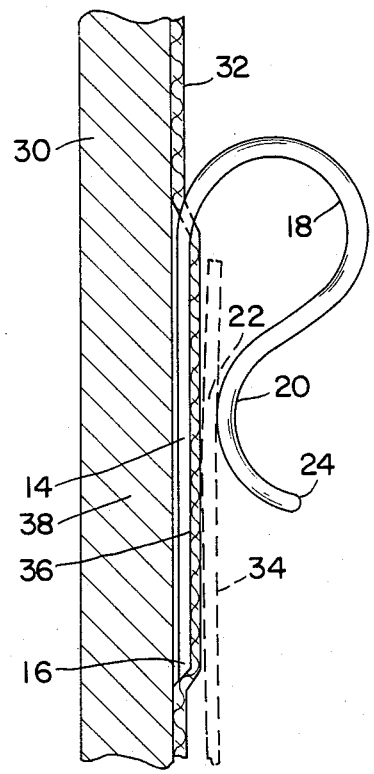
FIG. 3 is a side elevational view of the embodiment depicted in FIG. 1 showing its attached configuration to a modular wall unit.

FIG. 3 is a side elevational view of the first embodiment 10 depicting its utilization in a modular wall 30. As depicted in FIG. 3, the modular wall 30 is shown in cross-section having a fabric surface 32 disposed thereon. The lower end 16 of the straight portion 14 has been inserted downwardly through the fabric surface 32, such that the straight portion 14 is held between the outwardly-displaced fabric 36 and the backing material 38 of the wall 30. Typical fabrics utilized for modular wall units are fairly loosely woven fabrics, whereby it is quite easy to insert the clip 10 downwardly through the fabric without substantially damaging it. Removal of the clip typically leaves no mark on the fabric. FIG. 3 also depicts a single sheet of paper 34, shown in phantom in side view, held by the clip 10 against the wall 30. It is therefore to be understood that the gap 22 is sufficiently narrow to be widened by the insertion of a single sheet of paper into the clip, whereupon the paper 34 is held in the gap 22 between the bent portion 20 and the outwardly-displaced fabric 36 in front of the straight portion 14 of the clip.

In the preferred embodiment of the clip 10, the wire-like resilient material is composed of steel having a diameter of approximately 1 millimeters. The straight section 14 is approximately 2.5 centimeters, the loop has a radius of curvature of approximately 4 millimeters, the gap 22 is approximately 0.5 millimeters, and the gap 26 is approximately 2 millimeters. The clip may be composed of other materials such as plastics, metals, coated or anodized metals, or other materials having sufficient resilience to maintain a return spring force when the gap 22 is widened by the insertion of a sheet of paper therein.

The outwardly-depending end 24 serves to facilitate the insertion of papers into the clip. That is, gap 26 is larger than gap 22 and serves to guide upwardly inserted papers into narrow gap 22 for holding against the fabric, such that a sheet of paper 34 or a second sheet (not shown) can be inserted into the clip merely by pushing it upwardly through gap 26 and into and through gap 22. Thus papers can be inserted into the clip utilizing one hand to simply and easily insert them upwardly into the clip. To improve the clip's ability to hold papers, the inner surface of the wire proximate gap 22 of bent portion 20 may be roughened, coated or anodized 40 to increase frictional contact with the paper inserted therein. To increase frictional contact between the straight portion 14 and the displaced fabric 36, the inner surface 42 of the straight portion 14 may be roughened, coated or anodized to increase its frictional engagement with the fabric 36.

Figure 4:
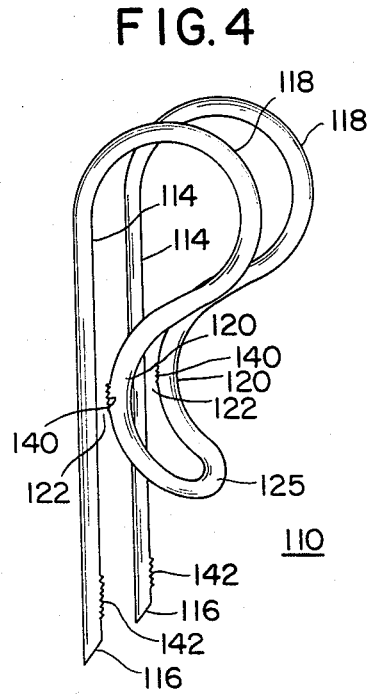
FIG. 4 is a perspective view of a second embodiment of the present invention.
Figure 5:
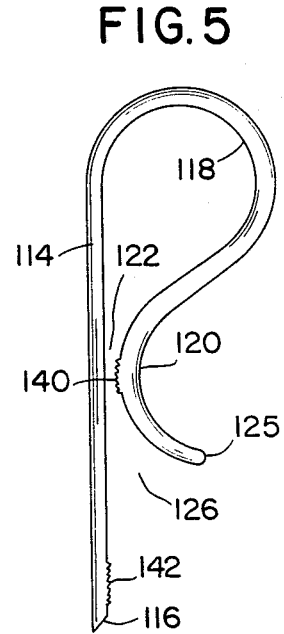
FIG. 5 is a side elevational view of the embodiment depicted in FIG. 4.
Figure 6:
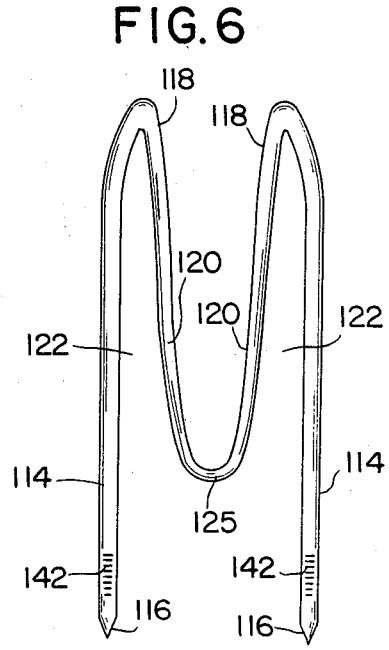
FIG. 6 is a front elevational view of the embodiment depicted in FIGS. 4 and 5.

FIGS. 4, 5 and 6 depict an alternative preferred embodiment 110 of the present invention. As will appear from a comparative examination of FIGS. 4 and 5 with FIG. 1, embodiment 110 can be thought of as two clips 10 that are joined together at ends 24 to form a continuous wire clip. Thus, utilizing a similar numbering sequence, clip 110 is formed with two straight portions 114, each preferably having a sharpened lower end 116. The upper ends of the straight sections 114 are bent into looped portions 118, which turn back toward the straight sections 114. Each looped portion 118 is then formed into an outwardly, downwardly bent portion 120, such that a narrow gap 122 is formed between each straight section 114 and a corresponding outwardly-bent portion 120. The two outwardly-bent portions 120 are joined together with a curved portion 125, such that a gap 126 is formed between the joining section 125 and the straight portions 114. As is best seen in FIG. 5, gap 126 is substantially larger than gap 122. It is therefore to be understood that clip 110 is preferably formed from a single section of wire that is bent into the shape depicted in FIGS. 4, 5 and 6.

As will appear from a comparison of embodiments 110 and 10 depicted in FIG. 6 and FIG. 2 respectively, embodiment 110 does not lie in a single plane as does embodiment 10. However, a comparison of FIGS. 1 and 5 reveals that the two embodiments 10 and 110 appear substantially identical in a side elevational view. Thus, the operation of clip 110 is substantially similar to the operation of clip 10, and can be understood with reference to FIG. 3 as follows. Both straight sections 114 of clip 110 (corresponding to straight portion 14 of FIG. 3) are inserted downwardly into the fabric surface 32 of a modular wall unit 30. A piece of paper 34 can thereafter be pushed upwardly through gaps 122 (corresponding to gap 22 of FIG. 3), such that the paper 34 is frictionally held between the inner surface of the bent portions 120 (corresponding to bent portion 20 of FIG. 3) and the outwardly-displaced fabric 36.

Because clip 110 is formed with two gaps 122, rather than the single gap 22 of clip 10, clip 110 possesses approximately twice the frictional holding force of clip 10. As with clip 10, the frictional engagement properties of clip 110 may be increased through the employment of a roughened, coated or anodized surface 140 formed on the inner surface of each bent portion 120. Likewise, a roughened, coated or anodized portion 142 formed on the straight portions 114 will aid in retaining the clip 110 within the fabric surface of the wall unit 30. The preferred dimensions and material for clip 110, for corresponding portions of clips 110 and 10, are substantially identical to those of clip 10. The preferred distance between the two straight portion 114, as depicted in FIG. 6, is approximately 2 millimeters.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A clip for holding substantially planar objects to a wall that is covered with a fabric outer layer, comprising:
   a single, continuous, wire-like member having two ends;
   said member having at least one straight portion formed proximate a first end of said two ends;
   said member being bent into a looped portion proximate said straight portion, said looped portion comprising an arc of greater than 180 degrees, such that said looped portion curves back toward said straight portion;
   an outwardly-curved portion formed in said member proximate said looped portion, such that a narrow gap is formed at the point of closest approach of said outwardly-curved portion with said straight portion;
   said outwardly-curved portion of said member curving away from said straight portion, such that a larger second gap is formed between said outwardly-curved portion and said straight portion;

said first end and a segment of said straight portion extending downwardly below said second gap;

said first end being formed into a pointed shape to facilitate penetration of said fabric covering of said wall.

2. The clip as described in claim 1 wherein said first gap is less than the thickness of a single piece of paper.

3. The clip as described in claim 2 wherein the surface of said outwardly curved portion of said member that is proximate said first gap is roughened to promote increased frictional engagement with planar materials that are inserted into said first gap.

4. A clip as described in claim 1 wherein a straight portion is formed proximate each of said ends of said member;

a looped portion is formed proximate each said straight portion, each said looped portion having an arc of greater than 180 degrees, such that said looped portions of said member curve back toward said straight portions;

said member being formed in outwardly-curved portions disposed proximate said looped portions, such that a first gap is formed proximate the points of closest approach of said outwardly-curved portions with said straight portions;

each of said outwardly-curved portions being joined together through a curved joining portion of said member;

each of said ends and a segment of each said straight portions proximate each of said ends extending downwardly below said second gap;

each of said ends being formed into a pointed shape to facilitate penetration of said fabric covering of said wall.

5. A clip as described in claim 3 wherein said straight portion proximate said first end is roughened to promote increased frictional engagement of said straight portion of said clip with said fabric material covering said wall.

6. A clip as described in claim 4 wherein each said straight portion proximate said two ends is roughened to promote increased frictional engagement of said straight portions of said clip with said fabric material covering said wall.

* * * * *